United States Patent Office 3,444,786
Patented May 20, 1969

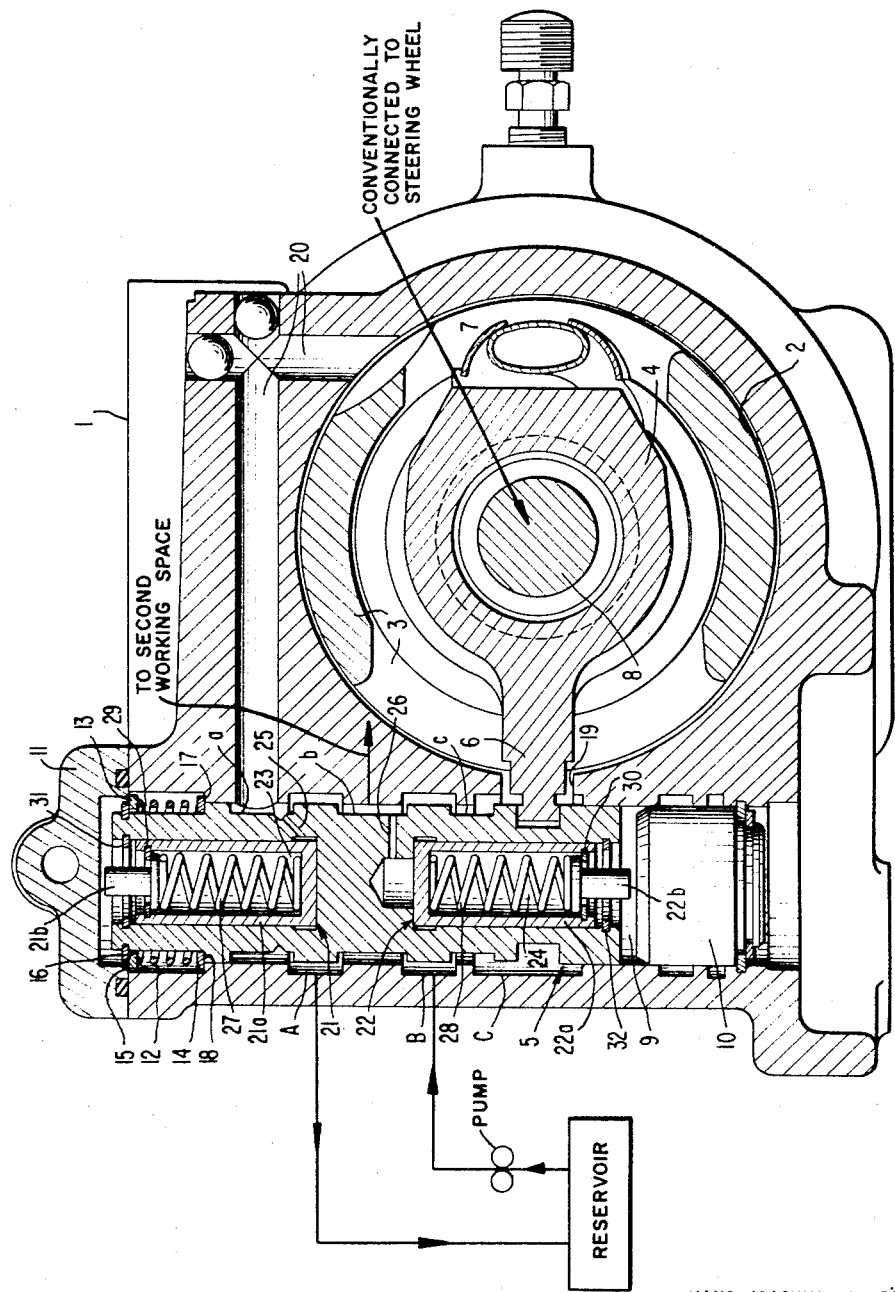

3,444,786
SERVO-STEERING MECHANISM FOR MOTOR
VEHICLES
Hans-Joachim M. Förster, Stuttgart-Riedenberg, and Klaus
Katz, Stuttgart, Germany, assignors to Daimler-Benz
Aktiengesellschaft, Stuttgart, Germany
Filed June 19, 1967, Ser. No. 646,837
Claims priority, application Germany, July 24, 1966,
D 50,384
Int. Cl. F15b 13/14
U.S. Cl. 91—434                                  16 Claims

ABSTRACT OF THE DISCLOSURE

A servo-steering mechanism for motor vehicles in which the manual force applied to the steering wheel is assisted by a servo-motor, which comprises a control slide valve assembly displaced by a transmitter member operatively connected by way of the steering spindle with the steering wheel, whereby the control slide valve selectively controls the supply of pressure medium to the two working chambers of the servo-motor; the slide valve assembly includes two pot-shaped piston elements, a piston member slidable within each pot-shaped piston element, and a spring between the pot-shaped piston element and the slidable piston member normally urging the piston member into engagement with the slide valve housing; the slide valve assembly is so connected with the working chambers that a first reaction force, resulting from the pressure of the liquid medium within a respective working space, though reduced to a smaller value, is applied to the pot-shaped piston element to produce a first reaction force opposing the manual force applied to the steering wheel; a retainer ring is inserted into the pot-shaped piston element as abutment for the piston member so as to eliminate the first reaction force when the first reaction force exceeds the prestress of the spring within the pot-shaped piston element by abutment of the pot-shaped piston element against the retainer ring. The spring force of the spring within the pot-shaped piston element constitutes a second reaction force in case of further increase of the steering force applied to the steering wheel once the first reaction force is overcome.

BACKGROUND OF THE INVENTION

The present invention relates to a servo-steering mechanism for motor vehicles having a servo-motor assisting the manual force at the steering wheel which servo-motor is controlled by way of a control slide valve in dependence on a transmitter member responsive to movements of the steering wheel, and in which a first reaction force derived from the respective servo-force and opposing the manual force is effective between the control slide valve and the associated reaction piston, and which includes a device for limiting the manual force in which means for limiting the relative movement between the control slide valve and the reaction piston are provided for purposes of eliminating the first reaction force as well as springy means engaging at the force-transmitting reaction piston are provided for producing a second reaction force also opposing the manual force.

SUMMARY OF THE INVENTION

The purpose and aim of the present invention essentially consists in improving a known servo-steering mechanism of the aforementioned type. For that purpose, it is proposed in accordance with the present invention that the reaction piston or pistons are constructed in a pot-like manner and the springy or elastic means for the second reaction force are arranged within the piston pot.

There is achieved by the present invention, inter alia, a shortening of the housing accommodating the control slide valve as well as a reduction of its weight. The arrangement and construction of reaction pistons and spring means is simplified so that assembly and disassembly of these parts is facilitated. With a given cross section of the slide member, the diameter of the reaction piston may be selected in an optimum manner by the construction according to the present invention and high reaction forces may thus be produced.

According to a further development of the present invention, the elastic or springy means for the second reaction force may engage, on the one hand, at the piston pot and, on the other, at a piston member telescopically displaceable within the piston pot which is adapted to be supported at the housing of the control slide valve.

According to a further feature of the present invention, a retainer ring may be inserted into the control slide valve for eliminating the first reaction force, the piston pot being adapted to be supported against the retainer ring. The advantage is achieved thereby that the means limiting a relative movement between control slide valve and reaction piston consist only of a single retainer ring adapted to be constructed in an advantageous manner as a standardized part which can be manufactured in a simple manner and can be readily assembled. The loads and stresses in the course of the support of the piston pot are reduced by the annularly-shaped support surface at the retainer ring.

In an advantageous construction of the servo-steering mechanism according to the present invention, a prestress of the springy or elastic means for the second reaction force may be produced by an abutment limiting the relative movement of the piston member displaceable within the piston pot. With such construction according to the present invention, the control slide valve member, the reaction piston and the springy means form a preassemblable, readily interchangeable structural unit.

According to one embodiment of the proposed servo-steering mechanism of the present invention, the abutment may be constituted by a retainer ring inserted into the piston pot, against which is adapted to be supported the piston member displaceable within the piston pot.

Accordingly, it is an object of the present invention to provide a servo-steering mechanism for motor vehicles which avoids by extremely simple and operationally reliable means the aforementioned shortcomings and drawbacks encountered with the prior art constructions.

Another object of the present invention resides in a servo-steering mechanism for motor vehicles which offers an improved operation.

A further object of the present invention resides in a servo-steering mechanism for motor vehicles which permits a reduction in the housing dimensions and weight of the servo-steering mechanism.

Still another object of the present invention resides in a servo-steering mechanism of the type mentioned above in which the various parts, particularly the reaction piston and elastic means, may be readily assembled and disassembled.

Still a further object of the present invention resides in a servo-steering mechanism enabling the production of relatively high reaction forces by simple parts that can be readily manufactured and installed.

A further object of the present invention resides in a servo-steering mechanism utilizing simple standardized parts which can be readily mass produced, thereby reducing the cost of manufacture and assembly.

Still another object of the present invention resides in a servo-steering mechanism in which the various parts can be sub-assembled thus reducing the over-all cost and facilitating the installation in the motor vehicle.

These and further objects, features, and advantages of the present invention will become more obvious from the following description when taken in connection with the accompanying drawing which shows, for purposes of illustration only, one embodiment in accordance with the present invention, and wherein:

The single figure is a transverse cross-sectional view through the housing of a servo-steering mechanism in accordance with the present invention.

Referring now to the single figure of the drawing, the housing 1 of the steering gear is provided with a cylindrical working space 2 for a working piston 3. The working piston 3 is connected with the steering nut 4 in a conventional manner so as to be axially non-displaceable but rotatable relative thereto: the nut 4, in turn, is provided with a radial arm 6 as transmitter member for a control slide valve generally designated by reference numeral 5 displaceable within the housing 1. The steering nut 4 is operatively connected with a steering worm 8 for relative spiral or helical movement by means of a circulating ball system of conventional construction of which only one guide duct 7 for the balls is visible in the drawing. The steering worm 8 itself is non-rotatably connected in any conventional manner (not illustrated) with the steering wheel of the motor vehicle so as to rotate in unison therewith.

The control slide valve assembly 5 is displaceably arranged within a housing bore 9 which is closed off at one end thereof by a closure part 10 and at the other end thereof by a housing cover 11 in a pressure and liquid-tight manner.

The control slide valve 5 is retained in the illustrated, normal position by a prestressed base-load spring 12 which is arranged concentrically to the control slide valve 5 and axially between ring-shaped abutment disks 13 and 14. In the normal position of the control slide valve member 5, the abutment disk 13 abuts simultaneously against an abutment surface 15 of the housing cover 11 and against an abutment surface 16 of the control slide valve member 5 whereas the abutment disk 14 abuts in a corresponding manner simultaneously against an abutment surface 17 of the housing 1 and against an abutment surface 18 of the control slide valve member 5.

For purposes of controlling the hydraulic pressure medium for the working piston 3 which is operatively connected in any conventional manner (not illustrated) with the steering shaft at the output side of the steering gear, three annularly-shaped control channels A, B and C are accommodated or machined into the housing bore 9. The control channel A is connected with a supply or reservoir tank for the pressure medium. The control channel B is connected with a pressure medium pump whereas the control channel C terminates directly by way of a housing aperture 19 in the first of the two working spaces formed by the piston 3 within the cylinder 2.

The control slide valve 5 is also provided with three annularly-shaped control channels *a*, *b*, and *c*. A channel 20 terminates within the area of the walls of the bore 9 opposite the control channel *a*; the channel 20 is in communication with the first working space of the cylinder 2. Depending on the position of the control channel *a*, the channel 20 is either closed off in a pressure tight manner or is connected with the control channel A and thus with the supply or reservoir tank for the pressure medium.

A channel (not shown) leading to the second work space within the cylinder 2 terminates within the area of the walls opposite the control channel *b*.

Depending on the displacement of the control slide valve assembly 5 in the one or the other direction, the pressure medium continuously supplied by the pump—which in the normal position flows back essentially without throttling and thus pressureless from the control channel B by way of the control channel A into the supply or reservoir tank—is throttled at the respective transition or passage between control channel B, on the one hand, and either control channel *b* or control channel *c*, on the other. As a result thereof, an excess pressure is produced in one of the working spaces compared to the pressure of the other working space.

One reaction piston generally designated by reference numerals 21 and 22, respectively, is coordinated to a corresponding one of the two working spaces of the working cylinders 2. The reaction pistons 21 and 22 are constructed pot-shped and are guided in a pressure-tight and displaceable manner in a respective axial bore 23 and 24 of the control slide valve 5.

The inner end of the axial bore 23 is in communication by way of a radial intermediate bore 25, the control channel *a* and the housing channel 20 with the first working space.

The inner end of the axial bore 24 is in communication by way of an intermediate radial bore 26 of the control slide valve 5, of control channel *b*, and of the associated housing channel (not shown) with the second working space in the working cylinder 2.

Each reaction piston 21 and 22 consists of a so-called piston pot 21*a* and 22*a* and of a piston member 21*b* and 22*b* telescopically displaceable within the same.

A reaction spring 27 and 28 is arranged on the inside of a respective piston pot 21*a* and 22*a*; the reaction spring 27 or 28 engages, on the one hand, at the piston pot 21*a* or 22*a*, and, on the other, at the movable piston member 21*b* or 22*b*, respectively.

The prestress of the reaction springs 27 and 28 is produced by a respective retainer ring 29 and 30 which is inserted into the associated piston pot 21*a* and 22*a* and against which is supported the movable piston member 21*b* and 22*b*.

The relative movements of each piston pot 21*a* and 22*a* with respect to the control slide valve 5 is limited by a retainer ring 31 and 32, respectively, which is inserted at the apertured end into the bore 23 and 24 of the control slide valve 5 receiving the corresponding reaction piston 21 and 22, respectively.

OPERATION

The operation of the servo-steering mechanism of the present invention is as follows:

If the arm 6 of the steering nut 4 is rotated by a manual force at the steering wheel, for example, in the clockwise direction, then a positive displacement of the control slide valve 5 takes place forcibly in the direction of the housing cover 11, provided the torque produced by the manual force is larger in its effect on the control slide valve 5 than the prestress of the base-load spring 12. As a result of this displacement of the control slide valve 5, the housing channel 20 is closed with respect to the control channel A and is connected by way of the intermediate bore 25 with the bore 23 for the reaction piston 21. Pressure then builds up in the first working space by reason of the communication of the latter with control channel B by way of control channels *c* and C and aperture 19. The pressure in the first working space connected to the housing channel 20 becomes effective thereby, in reduced magnitude, on the piston pot 21*a*. Under this influence, the piston pot 21*a*, the reaction spring 27, and the piston member 21b are displaced together toward the housing cover 11 and the piston member 21b is supported against the housing cover 11. Consequently, a first reaction force, which results from the pressure in the bore 23 and the effective surface of the piston pot 21a, opposes the force at the control slide valve 5 initiated by the steering nut arm 6 and therewith acts in opposition to the manual force to be applied to the steering wheel.

If this first reaction force exceeds the prestress force of the reaction spring 27 acting between piston pot 21a and piston member 21b, the first reaction force is automatically eliminated in that the piston pot 21a is supported with simultaneous compression of the reaction spring 27 at the retainer ring 31. With further increasing steering forces only the spring force of the spring 27 opposes as a second reaction force, the manual force transmitted by way of the steering nut arm 6 to the control slide valve 5, if one neglects the slight influence of the base-load spring 12.

If the arm 6 of the steering nut 4 is rotated by a manual force at the steering wheel in the opposite, counterclockwise direction, the control slide valve 5 is displaced in the opposite direction toward closure member 10 and the operation takes place in an analogous manner since pressure now builds up the second working space due to the closure of control channel A with respect to control channel b while the latter remains in communication with control channel B, i.e., with the supply pump; as before, the pressure in the second working space becomes effective, in reduced magnitude, on the piston pot 22a by way of intermediate bore 26 producing in succession the first and second reaction forces as described above.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are within the scope of persons skilled in the art.

We claim:

1. A servo-steering mechanism for motor vehicles with a servo-motor assisting the manual force applied to the steering wheel, comprising transmitter means responsive to the movement of the steering wheel, control slide valve means operatively connecting said transmitter means with said servo-motor to control the latter by the movements of the steering wheel, reaction piston means, means for producing a first reaction force between said control slide valve means and the reaction piston means which opposes the manual force, and means for eliminating the first reaction force including means for limiting the relative movement between the control slide valve means and the reaction piston means, and elastic means engaging at the force-transmitting reaction piston means for producing a second reaction force separate from said first reaction force and opposing the manual force applied to the steering wheel, the reaction piston means being of pot-like construction, and the elastic means for the second reaction force being arranged within the pot-like piston means.

2. A servo-steering mechanism according to claim 1, wherein said means for producing a first reaction force includes a piston member telescopically displaceable withing the piston pot of a respective pot-like piston means, the elastic means for the second reaction force engaging, on the one hand, against the piston pot and, on the other, against the piston member, and said piston member being adapted to be supported against the housing of the control slide valve means.

3. A servo-steering mechanism according to claim 2, wherein said means for eliminating the first reaction force includes retainer ring means inserted into the control slide valve means, the piston pot of a piston means being adapted to be supported against a respective retainer ring means.

4. A servo-steering mechanism according to claim 3, further comprising means for producing a prestress of the elastic means for the second reaction force including abutment means limiting the relative movement of the piston member displaceable within the piston pot of a respective pot-like piston means.

5. A servo-steering mechanism according to claim 4, wherein the abutment means is formed by a retainer ring means inserted into the piston pot, the piston member displaceable within a piston pot being adapted to be supported against said last-mentioned retainer ring means.

6. A servo-steering mechanism according to claim 1, wherein said means for eliminating the first reaction force includes retainer ring means inserted into the control slide valve means, the piston pot of a piston means being adapted to be supported against a respective retainer ring means.

7. A servo-steering mechanism according to claim 1, further comprising means for producing a prestress of the elastic means for the second reaction force including abutment means limiting the relative movement of the piston member displaceable within the piston pot of a respective pot-like piston means.

8. A servo-steering mechanism according to claim 7, wherein the abutment means is formed by a retainer ring means inserted into the piston pot, the piston member displaceable within a piston pot being adapted to be supported against said last-mentioned retainer ring means.

9. A servo steering mechanism according to claim 8, wherein said means for eliminating the first reaction force includes retainer ring means inserted into the control slide valve means, the piston pot of a piston means being adapted to be supported against a respective retainer ring means.

10. A servo-steering mechanism according to claim 7, wherein said means for producing a first reaction force includes a piston member telescopically displaceable within the piston pot of a respective pot-like piston means, the elastic means for the second reaction force engaging, on the one hand, against the piston pot, and, on the other, against the piston member, and said piston member being adapted to be supported against the housing of the control slide valve means.

11. A servo-steering mechanism according to claim 1, wherein said control slide valve means is movable within a valve housing, and wherein said reaction piston means are arranged in said movable control slide valve means.

12. A servo-steering mechanism according to claim 11, wherein said first reaction force is determined by the effective operating pressure multiplied by the effective area on the respective reaction piston means, while the second reaction force is determined by the force of a reaction spring.

13. A servo-steering mechanism according to claim 1, wherein said first reaction force is determined by the effective operating pressure multiplied by the effective area on the respective reaction piston means, while the second reaction force is determined by the force of a reaction spring.

14. A servo-steering mechanism according to claim 1, wherein said first reaction force is determined by the effective operating pressure multiplied by the effective area on the respective reaction piston means, while the second reaction force is determined by the force of a reaction spring with the respective reaction piston means fixedly supported against the control slide valve means.

15. A servo-steering mechanism according to claim 1, wherein said first reaction force is determined substantially exclusively by the effective operating pressure multiplied by the effective area on the respective reaction piston means, while the second reaction force is determined substantially exclusively by the force of a reaction spring.

16. A servo-steering mechanism according to claim 1, wherein said first reaction force is determined substantially exclusively by the effective operating pressure multiplied by the effective area on the respective reaction piston means, while the second reaction force is determined substantially exclusively by the force of a reaction spring with the respective reaction piston means fixedly supported against the control slide valve means.

References Cited

UNITED STATES PATENTS 2,922,440   1/1960   Hardy et al. _____ 91—434

PAUL E. MASLOUSKY, *Primary Examiner.*